Patented Aug. 9, 1938

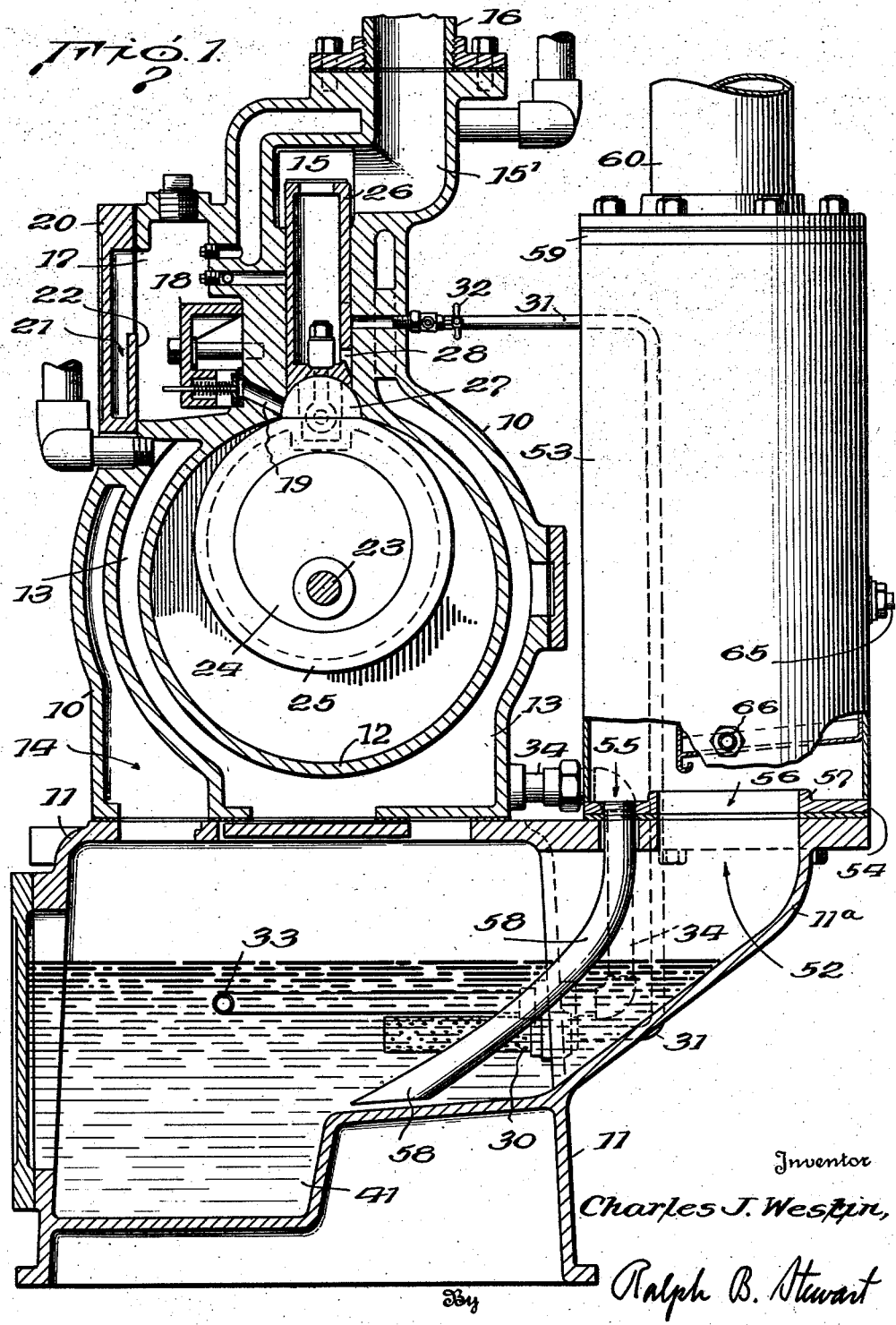

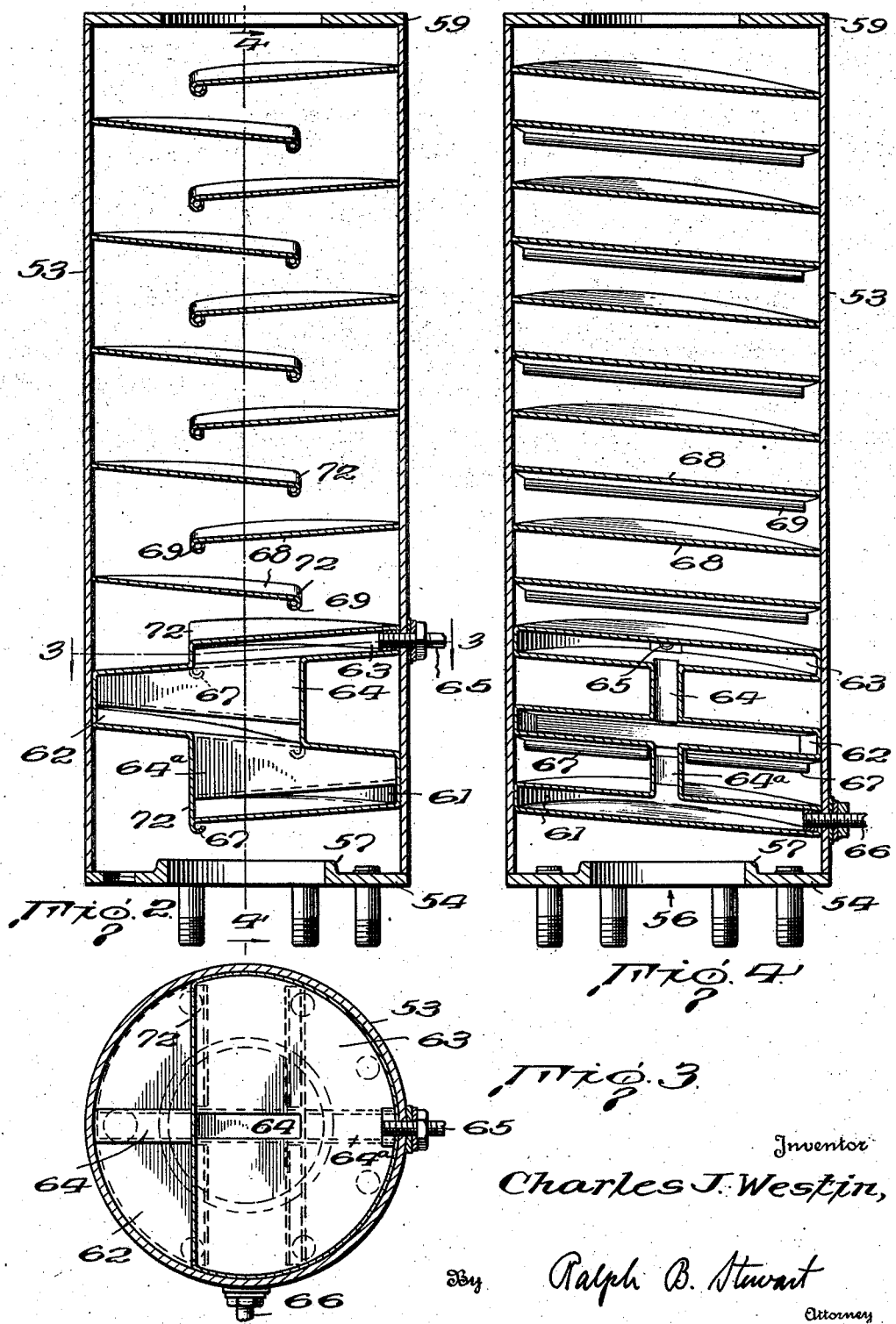

2,126,236

UNITED STATES PATENT OFFICE 2,126,236

SEPARATOR

Charles J. Westin, Philadelphia, Pa., assignor to F. J. Stokes Machine Company, a corporation of Pennsylvania Original application May 28, 1934, Serial No. 728,006. Divided and this application July 11, 1936, Serial No. 90,198

2 Claims. (Cl. 183—94)

This invention relates to separators and in particular to constructions for separating vaporized liquids, or mist, from gases. My invention is particularly useful in connection with vacuum pumps for separating vaporized oil from the discharge gases of the pump, although it may be used in any situation for separating vaporized liquids from gases. This application is a division of my copending application Ser. No. 728,006, filed May 28, 1934, which became Patent No. 2,073,188, Mar. 9, 1937.

In order to operate a vacuum pump at practical efficiency, all moving parts must be machined to close fits or small clearances so that they will cooperate throughout the cycle with the lubricating and sealing medium in forming a perfect or nearly perfect seal between the high and low pressure sides of the pump. It is of utmost importance that the sealing medium entering the pump system should be demulsified or freed of all air, gases or water. The sealing medium, of course, is brought in close contact with all the moving parts of the pump and should therefore embody such properties as make it suitable as a lubricating medium. The sealing-lubricating medium, which hereafter will be referred to merely as "oil" will therefore serve a dual purpose and should have certain desirable properties, such as low percentage of volatile constituent and a low demulsibility. Oil will, however, absorb gas in considerable quantities, particularly when churned around with gas under pressure as is the case in machines of the type here described. As the oil is continually circulating from atmospheric pressure, through the low pressure stage approaching the high pressure, and being expelled at high pressure into atmospheric pressure again, it is bound to become more and more polluted, thereby gradually decreasing the efficiency of the pump. Furthermore, the oil and gas are discharged at considerable speed and pressure through comparatively small discharge ports, and this has a tendency to vaporize or atomize some of the oil, which vapors or atomized oil would pass off with the gas and be lost unless properly trapped and separated from the free gases before these reach the outside space.

In my copending application Ser. No. 724,974 filed May 10, 1934, which became Pat. No. 2,- 070,151, Feb. 9, 1937, I show an arrangement for separating vaporized oil from the discharge gases of the vacuum pump wherein the gases are led from the discharge chamber of the pump through the space above the oil reservoir located in the base of the pump and out to the atmosphere. In this prior arrangement a separator is located within the base of the pump for separating the vaporized oil from gases as they pass through the base.

In medium sized and larger pumps of for example 50 cubic feet capacity and over, I find that, on account of the large volume of gases handled, the separator should be of considerable size to effectively devaporize the gases. For this reason it is preferable to place the separator outside the housing or oil reservoir. It is also a convenience in manufacture.

I have also found it very helpful to chill the gases as they enter the separator so as to cool and condense out the vapors entrained in the hot gases.

An object of my invention is to provide a novel separator structure for separating vaporized oil or liquids from the exhaust gases, the separator being formed as an independent unit mounted upon the base of the pump and having a duct for returning the condensed or separated oil to the oil reservoir within the base of the pump.

The principles of construction and novel arrangement of parts will be readily understood by reference to the annexed specification and drawings.

In the drawings, Figure 1 is a vertical view of my invention showing the pump with the exhaust separator, the pump being shown in full section and the separator in part section;

Figure 2 is a vertical section showing the details of construction of the separator unit;

Figure 3 is a sectional view of Fig. 2 taken along line 3—3; and

Figure 4 is a sectional view of Fig. 2 taken along line 4—4.

Referring to the drawings, there is shown a rotary pump having a housing 10 mounted on a hollow base 11. In the housing is formed a cylinder 12, closed at both ends by end-plates, and partially surrounded by a space 13 adapted to receive water or other cooling medium, and having a passage 14 for conducting the discharge gases and oil from the discharge valve into hollow base 11. The housing 10 is extended at the top to form an inlet compartment 15 of rectangular outline connected directly to and extending the full length of cylinder 12 and being closed at both ends by extensions on the cylinder end-plates. The inlet compartment 15 has a lateral extension 15' to which an intake connection 16 is secured. Alongside the intake compartment 15 in the extension of housing 10 is formed the outlet compartment 17 with suitable accommodations for the outlet valve assembly 18 arranged over a row of cylindrical discharge ports 19 connecting the outlet compartment 17 with the cylinder 12. One wall of compartment 17 is formed as a cover-plate 20 which is made hollow so as to provide a free passage 21 for the discharged gases and sealing medium into the corresponding passage 14 of the housing to which it is connected. The inside wall 22 of the passage 21 in cover-plate 20 is made of such height that it will act as a dam to retain a sufficient amount of the sealing medium in the outlet compartment 17 to completely cover or submerge the outlet valve arranged over ports 19, only the excess of sealing medium spilling over the dam 22 and escaping down into the base 11 together with the free gases and vapors. The details of the outlet valve construction are fully described and claimed in my copending application Ser. No. 724,974, filed May 10, 1934.

Through the center of cylinder 12 is mounted a shaft 23 with supporting bearings in the cylinder end-plates and driven from any suitable source of power. Keyed or otherwise fastened to shaft 23 is the rotary eccentric 24 which carries on the outer surface the tube-shaped oscillating piston 25. A slide valve 26 is fastened to the piston 25 by means of a hinge 27 of such construction as to provide a gas-tight and flexible connection between piston 25 and valve 26. This construction is described in greater detail and is claimed in the Sleeper and Westin patent referred to above. Through this connection valve 26 receives a reciprocating rectilineal motion in the rectangular inlet compartment 15, and as the valve 26 slides back and forth, the inlet ports 28 in the valve connect the inlet compartment 15 with the cylinder 12 at the proper time in the cycle.

All discharge gases, vapors and oil must pass over dam 22, through passages 21 and 14 down into the oil reservoir 41 in the base 11. This reservoir is of such construction as to provide ample space for the storing of the sealing medium or oil and also provides head-room or air space above the oil level for the gases to pass on to the separator 53 mounted upon a lateral extension 11a of the base 11. Connections are made from an oil filter 30 in the reservoir 41, through pipe line 31 to a valve 32, through which clean oil is drawn into the reciprocating valve chamber for lubricating and sealing purposes. A cooling coil 33 is usually provided in reservoir 41 and materially aids in keeping the operating temperature of the pump low by cooling the oil. Coil 33 is connected to the space 13 by pipe 34 for circulation of water through the coil.

A separator and other baffle arrangement may be used in the base but to get satisfactory separation these parts would have to be so large as to make the size of the base out of proportion. I, therefore, prefer to place a separator 53 of suitable size outside of the housing or reservoir and lead the gases and vapors from the reservoir into the separator through the duct 52 formed by extension 11a on which the separator is supported.

It is desirable that only the gases are allowed to pass off while the oil entrained in the gases or vaporized during the cycle of operation is separated out and returned to the reservoir for recirculation. Without proper means for perfect separation a considerable volume of vapors pass out into the surrounding room, particularly when starting the pump or when operating at low pressures, thus filling the room with disagreeable smoke. While, of course, it is possible to eliminate the smoke nuisance by connecting the discharge to the outside of the building, this does not prevent the resulting waste of good lubricating and sealing oil.

The above difficulties and losses have been eliminated through the use of separators constructed according to my invention. The separator construction is formed as a unitary structure bolted to a flange on base extension 11a. The separator consists of a casing 53, which may be of any outline, but for the sake of simplicity it is here shown as a cylinder. The bottom 54 has two openings communicating with the hollow base 11. The large opening 56 provides free passage for gases and vapors from outlet duct 52 into the separator. It will be noticed that a rim 57 is provided around opening 56. This rim forms an annular reservoir surrounding the inlet opening 56 and serves the purpose of keeping the separated oil from running back into the duct 52 where the current of gases may tend to retard the flow back into the reservoir or might pick up some additional oil particles. The oil flows back through the return passage or opening 55, which has a pipe 58 leading down into the reservoir 41 well below the oil level.

The top or head 59 of the separator has an exhaust connection 60 which may be a pipe line or duct through which the obnoxious gases may be discharged outside of the building.

The separator casing may be of any suitable diameter and height to accommodate the proper size and number of shelves or baffles necessary for proper separation. The spacing of the baffles should be such that the current of gases will pass through at a comparatively rapid rate of flow without creating any noticeable back-pressure. At the same time it is desirable to arrange the baffles so that the current will strike against the baffle-surfaces, causing some of the entrained oil to adhere to these, as well as force the current to make short bends or turns where the heavier oil particles are thrown against each other and unite into drops which fall down onto the sloping baffle surfaces below.

The whole separator casing may be filled with cooled baffles of the hollow-shelf type or with a combination of plain and cooled type as shown in Figures 2 to 4. A plain type of baffle is one of the simple plate construction as compared with the hollow box-like shelf or baffle which will be referred to as cooling shelves or cooling baffles.

In the construction shown, the casing 53 is provided with a number of baffles arranged across the casing, extending alternately from opposite sides of the casing past the middle thereof, thereby forming a zigzag path for the gases passing through the separator.

The first few shelves or baffles 61, 62 and 63 adjacent the inlet opening 56 are made hollow and have connections so that a cooling medium, such as water, may be circulated through them to chill the gases and vapors as they enter the separator. The various shelves 61, 62 and 63 are connected by communicating passages such as the hollow partitions or ducts 64 and 64a to permit the cooling fluid to be passed from one baffle to another. The water enters at 65, circulates through the hollow baffles and is discharged at 66. The edge 72 of the baffle which comes nearest the open passage will be referred to here as the front of the baffle or shelf.

It will be noticed that the baffles are mounted at an angle with the horizontal, sloping down diagonally towards the front as well as towards one side of the front edge. The reason for this slope or incline is to guide the oil collecting on top of the shelf towards one side where it will run down along the wall of the separator casing instead of, as otherwise might happen, anywhere and everywhere along the front edge in the path of the current. The angle of slope may be any suitable angle as long as the slope is sufficient to make the oil run off fast enough to prevent the forming of a drop. It will be noticed from the drawings that the first shelf 61 is supported in the separator so that it has an incline slope from right to left or from the casing to the right sloping down past the center to the front. At the same time it should also be noted that the far side of the shelf is higher than the near side, that is, the shelf is sloping from the far side wall to the near side wall and thus has a slope in two directions. The other shelves and baffles are arranged in a similar manner.

Another novel feature is the provision of a gutter 67 under the front edge of each baffle. The current of gases and vapors will strike against the bottom of the baffle and a portion of the entrained oil will adhere to this surface. When a sufficient quantity of oil has accumulated on the surface, this will flow towards the front and, instead of dropping off in the path of the current, will be collected in the gutter and run to the side and then down the wall of the casing. Thus, means are provided to prevent reabsorption of any oil which has been removed from the gases. It will be understood that the gutters 67 are not essential but will improve the efficiency of the separator.

The plain baffles consist of flat plates 68 which may or may not have gutters 69 of similar construction to 67 and serve the same purpose as described for the gutters on the cooling baffles. I prefer to arrange the plain baffles 68 according to the same principles described for the cooling baffles, that is, with the surfaces suitably sloping towards the front and one side in order to provide for the proper draining of the oil. For certain vacuum work I have found that the plain baffles 68 are quite satisfactory, and, of course, considerably cheaper to manufacture, and therefore a separator having only plain baffles would mean a considerable economy.

It will be observed that in the construction shown, the exhaust gases from the pump first pass from the outlet valve chamber 17 down through the passage 14 into the air space above the oil reservoir 41 in the base of the pump, and then out through the separator 53. By this arrangement, the gases are first freed of all oil which may be separated by gravity, and are partially cooled by passing over the oil reservoir before they reach the separator. In this way, a partial separation takes place as the gases flow through the air space above the reservoir, and the separator acts with greater efficiency in completing the separation process.

I have herein described the principle of my invention and illustrated a preferred embodiment thereof. Various modifications will occur to those skilled in the art, and I desire it to be understood that all modifications which fall within the terms of the appended claims are to be considered as falling within the scope of my invention.

What I claim is:

1. In a separator construction, a casing having inlet and outlet ports, a plurality of hollow baffle plates arranged within said casing and extending alternately from opposite sides of said casing past the middle thereof, means for circulating cooling fluid through said hollow plates, and gutters arranged on the front edges of said plates for collecting condensate from the bottom surface of the plates and conducting the same to the side walls of said casing.

2. In a separator construction, a vertical casing having an inlet at the bottom and an outlet at the top, a plurality of baffle plates arranged within said casing and extending alternately from opposite sides of said casing past the middle thereof, said baffle plates being sloped towards the front edges thereof and the front edges being arranged at an angle to the horizontal, and gutters arranged on the front edges of said plates for collecting liquid deposited on the bottom surfaces of said plates and conducting the same to the side walls of said casing.

CHARLES J. WESTIN.